United States Patent
Dalsgaard et al.

(10) Patent No.: US 10,779,278 B2
(45) Date of Patent: Sep. 15, 2020

(54) INTER-FREQUENCY AND INTRA-FREQUENCY MEASUREMENT MANAGEMENT

(71) Applicant: NOKIA TECHNOLOGIES OY, Espoo (FI)

(72) Inventors: Lars Dalsgaard, Oulu (FI); Li Zhang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/933,699

(22) Filed: Mar. 23, 2018

(65) Prior Publication Data

US 2018/0279312 A1 Sep. 27, 2018

Related U.S. Application Data

(60) Provisional application No. 62/476,240, filed on Mar. 24, 2017.

(51) Int. Cl.
*H04W 24/10* (2009.01)
*H04W 72/04* (2009.01)
*H04B 1/713* (2011.01)

(52) U.S. Cl.
CPC ........ *H04W 72/0453* (2013.01); *H04B 1/713* (2013.01); *H04W 24/10* (2013.01)

(58) Field of Classification Search
CPC ..... H04W 16/00; H04W 24/02; H04W 24/04; H04W 24/10; H04W 28/00; H04W 36/0088; H04W 72/0453; H04W 28/08; H04W 36/0072; H04W 4/70
See application file for complete search history.

(56) References Cited

U.S. PATENT DOCUMENTS

| | | | | |
|---|---|---|---|---|
| 2010/0034158 A1* | 2/2010 | Meylan | .................. | H04L 1/1854 370/329 |
| 2012/0113866 A1* | 5/2012 | Tenny | .................. | H04W 24/10 370/254 |
| 2014/0010189 A1* | 1/2014 | Tian | .................. | H04L 1/1822 370/329 |
| 2014/0094162 A1* | 4/2014 | Heo | .................. | H04W 4/70 455/422.1 |

(Continued)

OTHER PUBLICATIONS

Ericsson R4-1701554 Discussions on gap sharing for RRM measurement for Rel-14 feMTC; 2017; 3GPP TSG RAN WG4 Meeting #82 Athens, Greece, Feb. 13-17, 2017.

(Continued)

*Primary Examiner* — Jean A Gelin
(74) *Attorney, Agent, or Firm* — Squire Patton Boggs (US) LLP

(57) ABSTRACT

Various communication systems may benefit from improved measurement performance. For example, it may be helpful to manage intra-frequency and inter-frequency allocation in a measurement gap. A method may include receiving at a user equipment a signal comprising a measurement gap usage indication from a network entity. The measurement gap usage indication may include a prioritization of at least one carrier type. The method may also include allocating the measurement gap to grant the prioritized at least one carrier type a percentage of the measurement gap based on the measurement gap usage indication.

22 Claims, 6 Drawing Sheets

(56) References Cited

U.S. PATENT DOCUMENTS

| | | | | |
|---|---|---|---|---|
| 2014/0119310 A1* | 5/2014 | Shimizu | ............... | H04L 5/0053 370/329 |
| 2015/0016282 A1* | 1/2015 | Su | ................... | H04W 36/0085 370/252 |
| 2015/0050939 A1* | 2/2015 | Futaki | ................. | H04W 24/08 455/452.1 |
| 2015/0099523 A1* | 4/2015 | Yang | ................ | H04W 36/0088 455/438 |
| 2015/0245235 A1* | 8/2015 | Tang | ................... | H04W 24/10 370/252 |
| 2015/0312840 A1* | 10/2015 | Kazmi | ............... | H04W 40/244 455/456.2 |
| 2016/0316345 A1* | 10/2016 | Shauh | ................ | H04L 65/4076 |
| 2016/0337916 A1* | 11/2016 | Deenoo | .................. | H04W 8/22 |
| 2016/0338118 A1* | 11/2016 | Vajapeyam | ......... | H04B 17/318 |
| 2016/0373970 A1* | 12/2016 | Kulal | ................. | H04W 36/0016 |
| 2016/0381588 A1* | 12/2016 | Strobl | ................... | H04W 24/10 455/67.11 |
| 2017/0201973 A1* | 7/2017 | Yang | .................... | H04W 36/30 |
| 2017/0339660 A1* | 11/2017 | Kazmi | ................ | H04B 17/309 |
| 2018/0098253 A1* | 4/2018 | Huang | ................ | H04W 24/10 |
| 2018/0132124 A1* | 5/2018 | Huang | ................ | H04W 24/10 |
| 2018/0324619 A1* | 11/2018 | Harada | ................ | H04W 24/10 |

OTHER PUBLICATIONS

Huawei et al R4-1701414 Discussion on RRM requirements for FeMTC; 2017; 3GPP TSG-RAN WG4 # 82 Meeting Athens, Greece, Feb. 13-17, 2017.

Zhang et al R4-1702136 [draft] LS on measurement gap sharing for feMTC intra- and inter-frequency measurement; 2017; 3GPP TSG RAN WG4 Meeting #82 Athens, Greece, Feb. 13-17, 2017.

Huawei et al R4-1701395 CR on none uniform gap pattern; 2017; 3GPP TSG-RAN WG4 Meeting #82 Athens, Feb. 13-17, 2017.

3GPP 3GPP TS 36.133 V14.2.0 (Dec. 2016); 2016; 3rd Generation Partnership Project; Technical Specification Group Radio Access Network; Evolved Universal Terrestrial Radio Access (E-UTRA); Requirements for support of radio resource management (Release 14).

\* cited by examiner

| Network signaling | Value of X |
|---|---|
| '00' | 87.5 |
| '01' | 75 |
| '10' | 50 |
| '11' | Equal split |

Figure 2

| Network signaling | Value of X |
|---|---|
| '00' | 87.5 |
| '01' | 75 |
| '10' | 50 |
| '11' | 25 |

Figure 1

| Network indication (X) | Measurement gap usage |
|---|---|
| 00 | Half-half gap split |
| 01 | Equal gap split |
| 10 | Prioritize intra-frequency |
| 11 | Prioritize inter-frequency |

Figure 3

| Network indication | Value of X when UE is in prioritization mode | Value of X when UE is not in prioritization mode |
|---|---|---|
| 00 | Z=50 | Z=50 |
| 01 | Z=100/N$_{freq}$ | Z=100/N$_{freq}$ |
| 10 | Y$_{intra}$ | Z=50 or 100/N$_{freq}$ |
| 11 | 100-Y$_{intra}$ | Z=50 or 100/N$_{freq}$ |

Figure 4

| Network signaling | Prioritized type | Value of X when UE has no detected neighbor cells on prioritized type of carrier(s) | Value of X when UE has detected neighbor cells on prioritized type of carrier(s) |
|---|---|---|---|
| '00' | None | 50 | 50 |
| '01' | None | Equal split | Equal split |
| '10' | Intra-frequency | 100 | 50 |
| '11' | Inter-frequency | 0 | 50 |

INTER-FREQUENCY AND INTRA-FREQUENCY MEASUREMENT MANAGEMENT

CROSS REFERENCE TO RELATED APPLICATION

This application claims priority to U.S. Provisional Patent Application No. 62/476,240 filed on Mar. 24, 2017. The entire content of the above-referenced application is hereby incorporated by reference.

BACKGROUND

Field

Various communication systems may benefit from improved measurement performance. For example, it may be helpful to manage the allocation of a measurement gap.

Description of the Related Art

Recent third generation partnership project (3GPP) technology has been designed to support further enhanced machine type communication (feMTC) device, for example. A measurement gap is provided for feMTC devices and can allow feMTC devices to support both intra-frequency and inter-frequency measurements. Intra-frequency measurements are measurements taken of a cell having the same frequency as the serving cell of the user equipment, while inter-frequency are measurements taken of a cell having a different frequency. The measurement gap creates a small gap during which no transmission and reception are configured to occur at the feMTC device. Because there is no signal transmission and reception during the gap, the feMTC device can, if needed, switch frequencies to that of the target frequency, perform the measurement, and retune to the original frequency of the user equipment.

To support intra-frequency and inter-frequency measurements, the measurements gaps need to be shared between the intra-frequency and the inter-frequency measurements. Some recent 3GPP releases have imposed a fixed percentage of the measurement gap that is designated for measurement of normal performance carriers. The remaining percentage of the measurement gap is then designated for measurements of reduced performance carriers.

SUMMARY

According to certain embodiments, an apparatus may include at least one memory including computer program code, and at least one processor. The at least one memory and the computer program code may be configured, with the at least one processor, to cause the apparatus at least to receive a signal comprising a measurement gap usage indication from a network entity. The measurement gap usage indication may include a prioritization of at least one carrier type. The at least one memory and the computer program code may also be configured, with the at least one processor, to cause the apparatus at least to allocate the measurement gap to grant the prioritized at least one carrier type a percentage of the measurement gap based on the measurement gap usage indication.

An apparatus, in certain embodiments, may include means for receiving at a user equipment a signal comprising a measurement gap usage indication from a network entity. The measurement gap usage indication may include a prioritization of at least one carrier type. The apparatus may also include means for allocating the measurement gap to grant the prioritized at least one carrier type a percentage of the measurement gap based on the measurement gap usage indication.

According to certain embodiments, a non-transitory computer-readable medium encoding instructions that, when executed in hardware, perform a process. The process may include receiving at a user equipment a signal comprising a measurement gap usage indication from a network entity. The measurement gap usage indication may include a prioritization of at least one carrier type. The process may also include allocating the measurement gap to grant the prioritized at least one carrier type a percentage of the measurement gap based on the measurement gap usage indication.

According to certain other embodiments, a computer program product may encode instructions for performing a process. The process may include receiving at a user equipment a signal comprising a measurement gap usage indication from a network entity. The measurement gap usage indication may include a prioritization of at least one carrier type. The process may also include allocating the measurement gap to grant the prioritized at least one carrier type a percentage of the measurement gap based on the measurement gap usage indication.

According to certain embodiments, an apparatus may include at least one memory including computer program code, and at least one processor. The at least one memory and the computer program code may be configured, with the at least one processor, to cause the apparatus at least to determine a measurement gap usage indication. The measurement gap usage indication may include a prioritization of at least one carrier type for a user equipment. The at least one memory and the computer program code may also be configured, with the at least one processor, to cause the apparatus at least to send to the user equipment a signal comprising the measurement gap usage indication and the prioritization of the at least one carrier type.

An apparatus, in certain embodiments, may include means for determining at a network entity a measurement gap usage indication. The measurement gap usage indication may include a prioritization of at least one carrier type for a user equipment. The apparatus may also include means for sending from the network entity to the user equipment a signal comprising the measurement gap usage indication and the prioritization of the at least one carrier type.

According to certain embodiments, a non-transitory computer-readable medium encoding instructions that, when executed in hardware, perform a process. The process may include determining at a network entity a measurement gap usage indication. The measurement gap usage indication may include a prioritization of at least one carrier type for a user equipment. The process may also include sending from the network entity to the user equipment a signal comprising the measurement gap usage indication and the prioritization of the at least one carrier type.

According to certain other embodiments, a computer program product may encode instructions for performing a process. The process may include determining at a network entity a measurement gap usage indication. The measurement gap usage indication may include a prioritization of at least one carrier type for a user equipment. The process may also include sending from the network entity to the user equipment a signal comprising the measurement gap usage indication and the prioritization of the at least one carrier type.

A method, in certain embodiments, may include identifying one or more wireless coverage issue within an area. The method may also include receiving data demand information for the area having the identified one or more wireless coverage issues. In addition, the method may include receiving or determining a total cost of ownership. The total cost of ownership can include a cost of fixing the one or more wireless coverage issues within the area. Further, the method may include calculating a venue value index of the area based on at least one of the total cost of ownership, the data demand information, or an average spectrum efficiency. The method may in addition include performing at least one network administrative task based on the venue value index.

According to a first embodiment, a method may include receiving at a user equipment a signal comprising a measurement gap usage indication from a network entity. The measurement gap usage indication may include a prioritization of at least one carrier type. The method may also include allocating the measurement gap to grant the prioritized at least one carrier type a percentage of the measurement gap based on the measurement gap usage indication.

In an additional variant, the at least one carrier type may be an inter-frequency carrier or an intra-frequency carrier.

In a further variant, the method includes using the first percentage of the measurement gap for monitoring the prioritized at least one carrier type when the user equipment is in a prioritization mode.

In a variant, the prioritization of the at least one carrier type may expire after detecting a neighboring cell on the prioritized at least one carrier type.

In an additional variant, the prioritization of the at least one carrier type expires after a first threshold of the neighboring cell is met.

In another variant, the prioritization of the at least one carrier type is restored after falling below a first threshold of detected neighboring cell.

In a variant, the prioritization of the at least one carrier type may expire after an allotted amount of time.

In yet another variant, the allocation of the measurement gap to the prioritized at least one carrier type may be adjusted by using a second percentage of the measurement gap after the prioritization of the at least one carrier type expires. The second percentage may be different than the first percentage.

In another variant, the measurement gap usage indication may indicate for the user equipment to split the measurement gap according to a half-half split or an equal split between the at least one prioritized carrier type and another carrier type, or between the two carrier types without prioritizing one carrier type over another.

In an additional variant, a value of the measurement gap usage indication may depend on a coverage enhancement mode.

According to a second embodiment, a method may include determining at a network entity a measurement gap usage indication. The measurement gap usage indication may include a prioritization of at least one carrier type for a user equipment. The method may also include sending from the network entity to the user equipment a signal comprising the measurement gap usage indication and the prioritization of the at least one carrier type.

In a variant, a value of the measurement gap usage indication may depend on a coverage enhancement mode.

BRIEF DESCRIPTION OF THE DRAWINGS

For proper understanding of the invention, reference should be made to the accompanying drawings, wherein:

FIG. 1 illustrates an example of a table with fixed percentages.

FIG. 2 illustrates an example of a table according to certain embodiments.

FIG. 3 illustrates an example of a table according to certain embodiments.

FIG. 4 illustrates an example of a table according to certain embodiments.

DETAILED DESCRIPTION

Figure 5:
FIG. 5 illustrates an example of a table according to certain embodiments.

To help improve the utilization of the measurement gap by a user equipment (UE), and to overcome the problems caused by the rigidity of fixed percentages, certain embodiments may allow for a more dynamic use of the measurement gap. In particular, in certain embodiments, the UE may receive a measurement gap usage indication from a network entity. The measurement gap usage indication may include at least one prioritized carrier type, which allows the UE to prioritize certain carriers over other. Using the measurement gap usage indication may allow for increased flexibility when determining how to allocate the measurement gap or the plurality of measurement gaps between measurement of different carrier types, such as intra-frequency and inter-frequency carriers. The dividing of the measurement gap may be referred to below using the terms splitting, allocating, assigning, designating, or any other term.

FIG. 1 illustrates an example of a table with fixed percentages. As can be seen in FIG. 1, column 110 includes four network signals and column 120 includes the value of X associated with the network signaling. The value of X may be the percentage of the measurement gap designated to a given carrier type, such as a frequency carrier. X may also be included as part of the measurement gap usage indication sent to the UE.

FIG. 1 illustrates the use of 2-bit signaling for gap sharing, with 4 specific fixed X values. For example, a network signal of 00 may indicate a fixed X value of 87.5%. In other words, the user equipment may allocate 87.5% percent of the measurement gap towards intra-frequency carriers, and 12.5% percent of the remaining measurement gap towards inter-frequency carriers. Other network signals indicators in column 110 may be 01, 10, and 11, each designating a fixed X value of 75%, 50%, and 25%.

In certain embodiments, the association between the network signals and the fixed X value may be preconfigured in the UE by the network. In other embodiments, 2-bit signaling may be used in which the network signal may include the network signal indication in one bit and the fixed X value associated with the indication in another bit. The measurement gap usage indication may be transmitted to the UE using 2-bit signaling. Therefore, in some embodiments either of the tables shown in FIGS. 1-5, or the values included therein, may be preconfigured in the UE by the network. The UE may receive a signal including a measurement gap usage indication, and use the received measurement gap usage indication to look up the preconfigured X value associated with the received indication.

The fixed X values illustrated in FIG. 1 may not provide the UE or the system with sufficient flexibility. For example, 75% may be too small of a percentage in some embodiments that require more of the measurement gap for proper intra-frequency carrier measurements. It may also be difficult to achieve equal gap sharing between intra-frequency and intra-frequency carriers. For example, in an embodiment with two configured inter-frequency carriers, both carrier being considered of equal importance by the network, a 33% allocation for each carrier, including the one intra-frequency carrier, may be needed. 33%, however, may not be one of the fixed X values. To provide added flexibility, certain embodiments may include an X value that may be an equal split value.

FIG. 2 illustrates an example of a table according to certain embodiments. As can be seen in FIG. 2, the table may include network signaling column 210 and column 220 that includes the value of X associated with the network signaling indicators. While some of the network signal indicators, such as 00, 01, and 10, may have associated fixed X values, network signal indicator 11 may have an X value that may be indicated as an equal split.

The percentage value of an equal split, for example, may be calculated as $100/N_{freq}$, where $N_{freq}$ may be the total number of carriers, including both intra-frequency and inter-frequency carriers. The inclusion of the equal split, for example, may allow for the 33% allocation in the example presented above in which two inter-frequency carriers may be configured. While the embodiment of FIG. 2 provides for some added flexibility, the flexibility may not be enough to accommodate a network prioritization of one type of carrier. While some of the embodiments refer to intra-frequency and inter-frequency carriers, any other type of carrier may be accommodated. In addition, in some embodiments two or more carriers may be prioritized.

For example, the network may choose to prioritize an intra-frequency carriers over inter-frequency carriers, or vice versa. In order to prioritize intra-frequency carriers in the table shown in FIG. 2, the network, for example, may signal a network signal indicator of 00 to the UE. The UE may then allocate 87.5% of the measurement gap for intra-frequency measurements. The prioritized intra-frequency carrier measurement performance, however, may still be negatively affected by the 12.5% configured for inter-frequency carrier measurements.

FIG. 3 illustrates an example of a table according to certain embodiments. As can be seen in FIG. 3, the table includes a network indicator 310 and a measurement gap usage 320, instead of a fixed X value. The rules or mathematical schemes associated with the measurement gap usage, also referred to as Z, may indicate to the UE how to weigh the distribution of the measurement gaps. In other words, the measurement gap usage may indicate different gap sharing schemes, some of which may depend on the prioritization of certain carrier types. Network indicator 00, for example, may have a half-half split. The half-half split may mean that the UE may use 50% of a given measurement gap for intra-frequency measurements, and the remaining 50% of the gap for inter-frequency measurements. The half-half split rule, for example, may be independent of the number of configured inter-frequency carriers.

Network indicator 01, for example, may be an equal distribution split, similar to the equal split in FIG. 2. The equal gap split may be represented by the following equation: $Z=100/N_{freq}$. In an equal split, the measurement gap may be equally distributed between each intra-frequency and inter-frequency carrier. For example, if 3 inter-frequency carries are configured, meaning that a total of 4 carriers are measured by the UE, Z may equal 25%.

Network indicators 10 and 11, on the other hand, signal to the UE that it may allocate the measurement gap depending on which prioritization mode may be configured. A network indicator of 10, for example, may indicate to the UE that intra-frequency carrier measurements are prioritized. The UE may therefore prioritize intra-frequency carrier measurements over inter-frequency carrier measurements, and assign intra-frequency carriers more of the measurement gap or plurality of measurement gaps. The more of the measurement gap the UE may use for intra-frequency carrier measurements, the more time the UE may spend performing measurements, and the lower the latencies may be for receiving the results of the measurements. In certain embodiments, when the UE may have a number of intra-frequency neighbor cells monitored and detected that is greater than or equal to a certain threshold number of neighboring cells $N_{intra}$, the UE may overrule or cease to abide by the network indicator and not prioritize the intra-frequency measurements. An embodiment of the ceasing to abide by the network indicator may be described below in the description of FIG. 5. Threshold $N_{intra}$ may represent one or more neighboring cells.

On the other hand, a network indicator of 11, for example, may indicate to the UE that inter-frequency carrier measurements are prioritized over intra-frequency measurements, and assign inter-frequency carriers more of the measurement gap or more of the plurality measurement gaps. In certain embodiments, however, when the UE may have a number of inter-frequency neighbor cells detected and monitored that is greater than or equal to a certain threshold number of neighboring cells $N_{inter}$, the UE may overrule the network indicator and not prioritize the inter-frequency measurements. Threshold $N_{inter}$ may represent one or more neighboring cells. $N_{inter}$ or $N_{intra}$ may be referred to as a first number or first threshold.

When the UE receives, and does not overrule, a network indicator that may have an associated measurement gap usage that prioritizes intra-frequency or inter-frequency carriers, the UE may be said to be in a prioritization mode. When intra-frequency measurement may be prioritized, the UE may use a $Y_{intra}$ percentage, also known as a first percentage, of the measurement gap for intra-frequency measurement. The percentage value of $Y_{intra}$, for example, may be preconfigured at the UE, defined in network specification, and/or may be dynamically configurable by the network. When the inter-frequency measurement may be prioritized, on the other hand, the UE may use $100-Y_{intra}$ % of the measurement gap for intra-frequency carrier measurements and use $Y_{intra}$ percentage of the measurement gap for inter-frequency measurement.

Although some of the above embodiments may refer to a single measurement gap, and the splitting of the gap between intra-frequency and inter-frequency carriers, certain embodiments may relate to a plurality of measurement gaps. The UE may therefore split the plurality of measurement gaps in accordance with the $Y_{intra}$. For example, when the UE may be in an intra-frequency prioritization mode, the UE may utilize the $Y_{intra}$ percentage for the total number of the plurality of gaps to intra-frequency measurements. In certain embodiments, the UE may be assigned a measurement gap pattern. A gap pattern may be a fixed allocation of measurement gaps in a repeated manner. For example, one gap pattern may be a 6 milliseconds (ms) measurement gap repeated every 40 ms. The measurement gaps may be allocated by network and assigned until they are deconfigured by network.

FIG. 4 illustrates an example of a table according to certain embodiments. The table in FIG. 4 includes column 410 that includes the network indication, column 420 that includes the X values when the UE may be in a prioritized mode, and column 430 that includes that X values when the UE may not be in a prioritization mode. As can be seen in column 430, when the UE may not be in a prioritized mode, the UE may follow either a half-half split or an equal split when performing intra-frequency and inter-frequency carrier measurements.

FIG. 4 may also illustrate that the X values associated with the network indicators 00 and 01 may not be dependent on whether or not the UE may be in a prioritization mode. On the other hand, the value of X associated with the network indicators 10 and 11 may depend on whether or not the UE may be in a prioritization mode. When the UE may be in a prioritization mode, the X values of the UE may be $Y_{intra}$ and $1-Y_{intra}$, respectively. When the UE may not be in a prioritization mode, the X value of the UE may be a half-half split, indicated as Z=50, or an equal split, indicated as $100/N_{freq}$.

FIG. 5 illustrates an example of a table according to certain embodiments. FIG. 5 includes four different columns, column 510 includes network signaling indicators, and column 520 includes a prioritized type, also known as prioritization type. Column 530 includes an X value when the UE has no detected neighbor cells on the prioritized type carrier, and column 540 includes an X value when the UE has a detected neighbor cells on the prioritized type carrier. As can be seen in the embodiments shown in FIG. 5, when intra-frequency carriers may be prioritized, the intra-frequency carrier measurements may be allocated 100% of the measurement gaps, while the inter-frequency measurements may be allocated 0%. When neither the intra-frequency carriers nor the inter-frequency carriers are prioritized, the measurement gaps may be equally split or split 50-50 between the carriers, as shown in FIG. 5.

In certain embodiments, when the network indicates to the UE to prioritize intra-frequency carrier measurement, for example, using with network signaling indicator 10, the $Y_{intra}$ percentage used by the UE may be very large. Very large, for example, may be a $Y_{intra}$ percentage of 100 or close to 100. In some embodiments, the very large $Y_{intra}$ percentage may be used for intra-frequency until at least one intra-frequency neighbor cell has been detected. Once an intra-frequency neighbor cell has been detected, the UE may lower the $Y_{intra}$ percentage, and re-allocate part of the measurement gaps for inter-frequency carrier measurements. For example, a half-half split, also referred to as a 50-50 split, or an equal split may be implemented at the UE.

If the UE loses one or more detected intra-frequency cells, it may once again allocate the very large $Y_{intra}$ percentage of the measurement gaps for intra-frequency carrier measurements. In certain other embodiments, a similar allocation and re-allocation process may be performed by the UE when the UE may be prioritized for inter-frequency measurements. The allocation and the re-allocation described above may be part of a load balancing procedure performed by the UE.

The above embodiments may allow the UE to more likely than not have a detected neighbor cell on the prioritized type of carrier. In other words, the UE, more likely than not, may have a detected neighbor cell with which it shares a frequency carrier. In certain embodiments, the measurement performance for the prioritized type of carriers may not suffer because of the large $Y_{intra}$ percentage of the measurement gaps assigned to the prioritized carrier, even when the UE may be configured to measure both intra-frequency and inter-frequency carrier. When the UE may detect neighbor cells on the prioritized type of carrier, it may use more of the measurement gaps for another carrier type. This may avoid having a large amount of gaps for a certain type of carrier for an extended period of time, or for longer than the large percentage of the gap may be needed by the UE. The value of X, in certain embodiments, may be based on already detected neighbor cells on the prioritized type of carrier.

In certain embodiments, the X values may depend on the coverage enhanced mode of the network. Two different X values may be provided for two different coverage enhanced modes. In certain embodiments, for example, an X value of a network indicator in a coverage enhanced mode A may be different that the X value of the same network indication in a coverage enhanced mode B. Coverage enhanced mode B may be characterized by a medium or large number of repetitions for Physical Random Access Channel (PRACH), while coverage enhanced mode A may be characterized by a small number of or no PRACH repetitions. In coverage enhanced mode B, the transmission power of the UE may be higher than that of coverage mode A. The measurement gap usage indication in certain embodiments may therefore depend on a coverage enhancement mode. In certain other embodiments, the serving cell conditions and/or the number and conditions of the detected neighbor cells may be used in determining X. In certain embodiments, the conditions may be either the normal coverage or the enhanced coverage of the UE.

Figure 6:
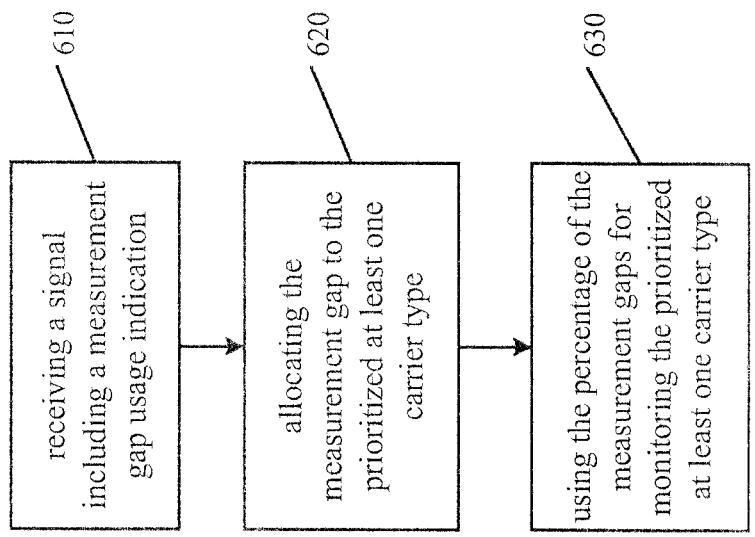
FIG. 6 illustrates an example of a method according to certain embodiments

FIG. 6 may illustrate an example of a method according to certain embodiments. In particular, FIG. 6 may illustrate a method performed by a UE, such as a machine-type-communication device. In step 610, the user equipment may receive a signal including a measurement gap usage indication from a network entity. The measurement gap usage indication may include a prioritization of at least one carrier type. The at least one carrier type may be a frequency carrier, for example, an inter-frequency carrier or an intra-frequency carrier. The signal, in some embodiments, may comprise two bits. One of the two bits comprises the measurement gap usage indication and another one of the two bits comprises the percentage of the measurement gap.

In step 620, the UE may allocate the measurement gap to grant the prioritized at least one carrier type a percentage of the measurement gap based on the measurement gap usage indication. In certain embodiments, the measurement gap usage indication may indicate for the user equipment to split the measurement gap according to a half-half split or an equal split between the at least one prioritized carrier type and another carrier type. In other embodiments, the measurement gap usage indication may indicate different gap sharing schemes, where at least one of the different gap sharing schemes is based on the prioritized at least one carrier type.

The user equipment, in some embodiments, may be preconfigured with the percentage of the measurement gap associated with the measurement gap usage indication. The percentage of the measurement gap may be based on at least one of a coverage enhanced mode of a network, a number of detected neighbor cells on the prioritized at least one carrier type, or a condition of a serving cell or the detected neighbor cells.

In step 630, the UE may use the percentage of the measurement gaps for monitoring the prioritized at least one carrier type when the user equipment is in a UE is in prioritization mode. In certain embodiments, the UE may detect at least one neighboring cell on the prioritized at least one carrier type. In some embodiments, the allocation of the measurement gap to the prioritized at least one carrier type may be adjusted after the UE detects one or more neighboring cells using the prioritized at least one carrier type. For example, the prioritization of the at least one carrier type may expire after detecting a neighboring cell on the prioritized at least one carrier type. In another example, the prioritization of the at least one carrier type expires after a first threshold of the neighboring cell is met. Meeting the first threshold of the neighboring cell may mean that the number of neighboring cell or cells detected is higher or better than a value of the first threshold.

In certain other embodiments the prioritization of the at least one carrier type may be restored after falling below a first threshold of detected neighboring cell. Falling below the first threshold of the neighboring cell may mean that the number of neighboring cell or cells detected is lower or worse than a value of the first threshold. In some embodiments, the first threshold of the detected neighboring cell that is met, and the first threshold of the neighboring cell that is fallen below may be either the same or different thresholds. In yet another example, the prioritization of the at least one carrier type may expire after an allotted amount of time. The allocation of the measurement gap to the prioritized at least one carrier type may be adjusted by using another percentage of the measurement gap after the prioritization of the at least one carrier type expires, and the another percentage is different than the percentage.

Figure 7:
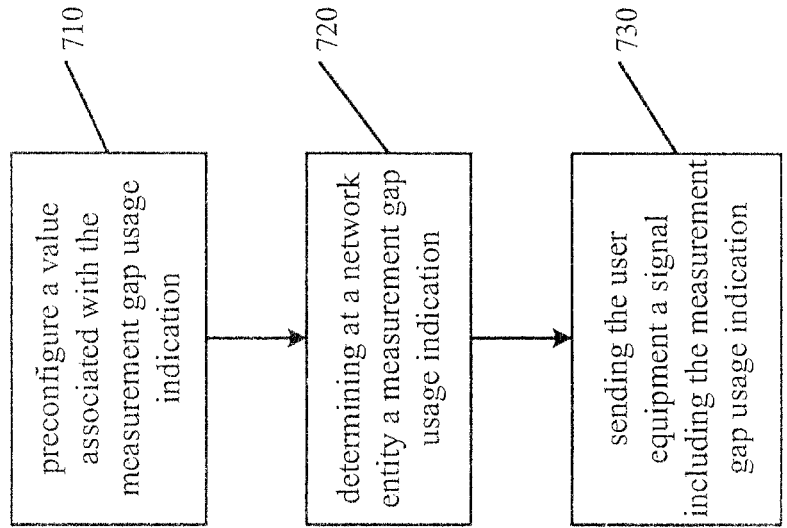
FIG. 7 illustrates an example of a method according to certain embodiments.

FIG. 7 may illustrate an example of a method according to certain embodiments. In particular, FIG. 7 illustrates a method performed by the network entity. The network entity shown in FIG. 7 can communicate with the user equipment described in FIG. 6. In step 710, the network entity may preconfigure a value associated with the measurement gap usage indication. In step 720, the network entity may determine a measurement gap usage indication. The measurement gap usage indication may include a prioritization of at least one carrier type for a user equipment. In some embodiments, the determined measurement gap usage indication may be different than the preconfigured value associated with the measurement gap usage indication. The network entity may then send the user equipment a signal comprising the measurement gap usage indication and the prioritization of the at least one carrier type, as shown in step 730.

Figure 8:
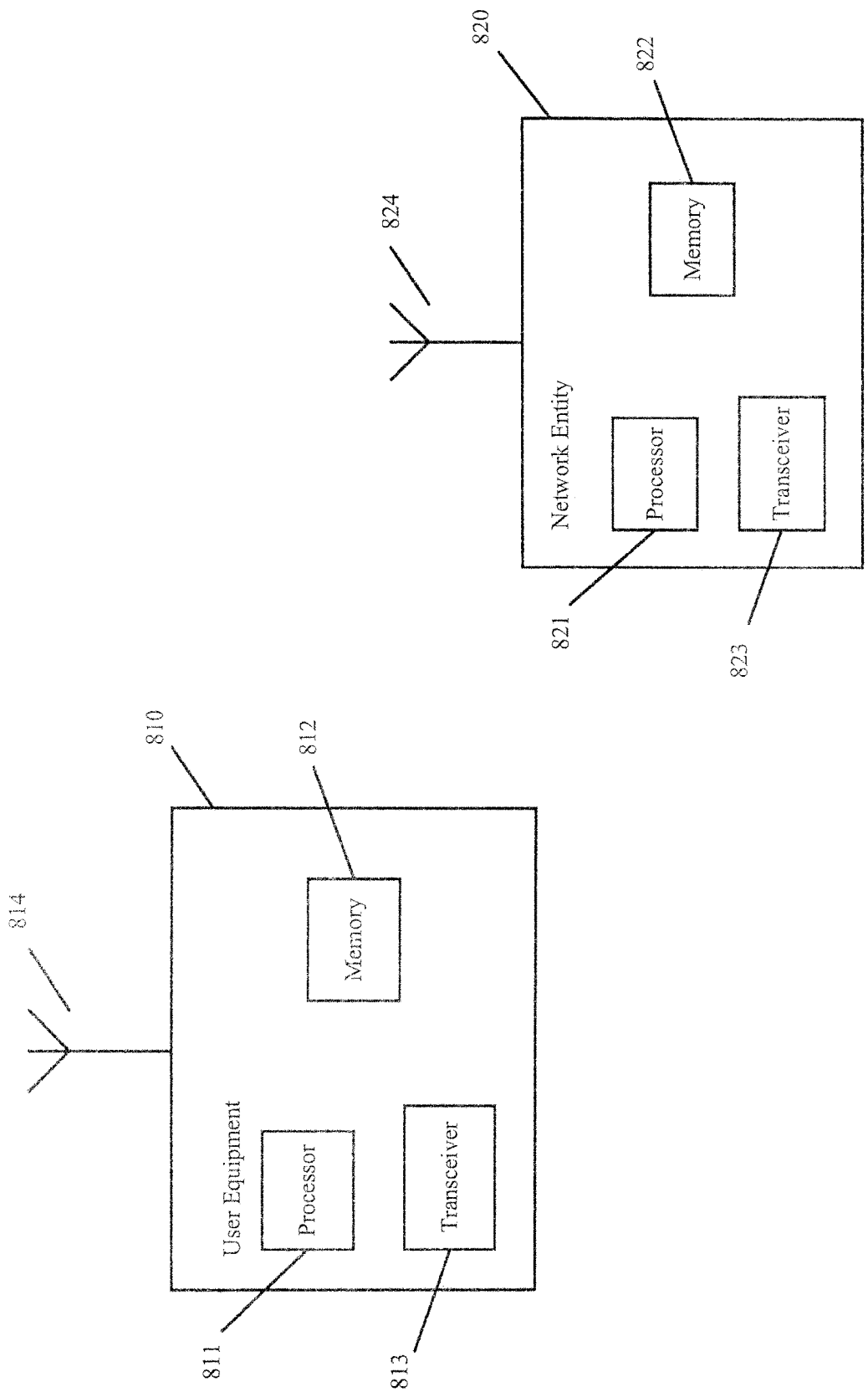
FIG. 8 illustrates an example of a system according to certain embodiments.

FIG. 8 illustrates a system according to certain embodiments. It should be understood that each table, signal, or block in FIGS. 1-7 may be implemented by various means or their combinations, such as hardware, software, firmware, one or more processors and/or circuitry. In one embodiment, a system may include several devices, such as, for example, network entity 820 or UE 810. The system may include more than one UE 810 and more than one network entity 820. Network entity 820 may be a base station, an access point, an access node, a evolved NodeB (eNB), a New Radio Node B, a server, a host, or any other network entity that may communicate with the UE.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Other configurations of these devices, for example, may be provided. For example, network entity 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network entity deliver local content. One or more functionalities may also be implemented as virtual application(s) in software that can run on a server.

A user device or UE 810 may be a mobile station (MS), such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network entity, may include means for carrying out embodiments described above in relation to FIGS. 1-7. In certain embodiments, at least one memory including computer program code can be configured to, with the at least one processor, cause the apparatus at least to perform any of the processes described herein.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 820 or UE 810, to perform any of the processes described above (see, for example, FIGS. 1-7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-7. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Furthermore, although FIG. 8 illustrates a system including a network entity 820 and UE 810, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 810 may likewise be provided with a variety of configurations for communication other than communicating with network entity 820. For example, the UE 810 may be configured for device-to-device, machine-to-machine, or vehicle-to-vehicle communication.

The above embodiments provide for significant improvements to the functioning of a network and/or to the functioning of the network entities within the network, or the user equipment communicating with the network. For example, the above embodiments may allow for increased flexibility when dividing the measurement gap. Certain embodiments may also allow for dynamic configuration of the measured gap usage, which may help to prevent unnecessary signaling by the UE during frequency carrier measurements.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to further enhanced Machine Type Communication, the above embodiments may apply to any other 3GPP technology or non-3GPP technology, such as IoT technology, LTE, LTE-advanced, fourth generation (4G) technology, and/or fifth generation (5G) technology, New Radio technology, or Carrier Aggregation technology.

PARTIAL GLOSSARY

3GPP third generation partnership project
feMTC further enhanced machine type communication
UE user equipment
PRACH physical random access channel

We claim:

1. A method comprising:
receiving, at a user equipment, at least one signal comprising at least one measurement gap usage indication from a network entity, wherein the at least one measurement gap usage indication includes a prioritization of at least one carrier type and a gap sharing scheme configured for allocating a measurement gap between measurements of intra-frequency and inter-frequency carriers; and
allocating the measurement gap between the measurements of intra-frequency and inter-frequency carriers to grant the prioritized at least one carrier type a percentage of the measurement gap based on the at least one measurement gap usage indication, wherein
the percentage of the measurement gap is associated with at least one coverage enhanced mode of the user equipment.

2. The method according to claim 1, wherein the percentage of the measurement gap associated with the at least one measurement gap usage indication is preconfigured at the user equipment.

3. The method according to claim 1, wherein the percentage of the measurement gap is based on at least one of a coverage enhanced mode of the user equipment, a number of detected neighbor cells on the prioritized at least one carrier type, or a condition of a serving cell or the detected neighbor cells.

4. The method according to claim 1, wherein the at least one carrier type is an inter-frequency carrier or an intra-frequency carrier.

5. The method according to claim 1, further comprising:
using a percentage of the measurement gap for monitoring the prioritized at least one carrier type when the user equipment is in a prioritization mode.

6. The method according to claim 1, wherein the prioritization of the at least one carrier type expires after detecting a neighboring cell on the prioritized at least one carrier type.

7. The method according to claim 6, wherein the prioritization of the at least one carrier type expires after a first threshold of the neighboring cell is met.

8. The method according to claim 1, wherein the prioritization of the at least one carrier type is restored after falling below a first threshold of at least one detected neighboring cell.

9. The method according to claim 1, wherein the prioritization of the at least one carrier type expires after an allotted amount of time.

10. The method according to claim 1, wherein the allocation of the measurement gap to the prioritized at least one carrier type is adjusted by using another percentage of the measurement gap after the prioritization of the at least one carrier type expires, and wherein the another percentage is different than the percentage.

11. The method according to claim 1, wherein the at least one measurement gap usage indication indicates to the user equipment to split the measurement gap according to a half-half split or an equal split between the at least one prioritized carrier type and another carrier type, or between the two carrier types without prioritizing one carrier type over another.

12. The method according to claim 1, wherein at least one additional gap sharing scheme is based on the prioritized at least one carrier type.

13. The method according to claim 1, wherein the signal comprises two bits, wherein one of the two bits comprises the at least one measurement gap usage indication and another one of the two bits comprises the percentage of the measurement gap.

14. A method comprising:
   determining, at a network entity, at least one measurement gap usage indication, wherein the at least one measurement gap usage indication includes a prioritization of at least one carrier type for a user equipment and a gap sharing scheme configured for allocating the measurement gap between measurements of intra-frequency and inter-frequency carriers; and
   sending, from the network entity, to the user equipment at least one signal comprising the at least one measurement gap usage indication, wherein
   the percentage of the measurement gap is associated with at least one coverage enhanced mode of the user equipment.

15. The method according to claim 14, wherein the percentage of the measurement gap is based on at least one of a coverage enhanced mode of the user equipment, a number of detected neighbor cells on the prioritized at least one carrier type, or a condition of a serving cell or the detected neighbor cells.

16. The method according to claim 14, wherein the prioritization of the at least one carrier type expires after detecting a neighboring cell on the prioritized at least one carrier type.

17. The method according to claim 16, wherein the prioritization of the at least one carrier type expires after a first threshold of the neighboring cell is met.

18. The method according to claim 14, wherein the prioritization of the at least one carrier type is restored after falling below a first threshold of at least one detected neighboring cell.

19. The method according to claim 14, wherein the allocation of the measurement gap to the prioritized at least one carrier type is adjusted by using another percentage of the measurement gap after the prioritization of the at least one carrier type expires, and wherein the another percentage is different than the percentage.

20. The method according to claim 14, wherein the at least one measurement gap usage indication indicates different gap sharing schemes, wherein at least one of the different gap sharing schemes is based on the prioritized at least one carrier type.

21. The method according to claim 14, wherein the signal comprises two bits, wherein one of the two bits comprises the measurement gap usage indication and another one of the two bits comprises the percentage of the measurement gap.

22. An apparatus comprising:
   at least one memory comprising computer program code; and
   at least one processor,
   wherein the at least one memory and the computer program code are configured, with the at least one processor, to cause the apparatus at least to:
   receive at least one signal comprising at least one measurement gap usage indication from a network entity, wherein the at least one measurement gap usage indication includes a prioritization of at least one carrier type and a gap sharing scheme configured for allocating the measurement gap between measurements of intra-frequency and inter-frequency carriers; and
   allocate the measurement gap between the measurements of intra-frequency and inter-frequency carriers to grant the prioritized at least one carrier type a percentage of the measurement gap based on the at least one measurement gap usage indication, wherein
   the percentage of the measurement gap is associated with at least one coverage enhanced mode of the user equipment.

* * * * *